(12) United States Patent
Ido (10) Patent No.: US 6,307,898 B1
(45) Date of Patent: Oct. 23, 2001

(54) PHASE ERROR DETECTOR

(75) Inventor: Jun Ido, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/243,807

(22) Filed: Feb. 3, 1999

(30) Foreign Application Priority Data

Apr. 15, 1998 (JP) .................................................. 10-105049

(51) Int. Cl.[7] .............................. H04L 27/22; H04L 27/14
(52) U.S. Cl. ............................................ 375/326; 329/307
(58) Field of Search .................................... 375/326, 327, 375/371, 373, 260, 340; 329/304, 307, 308, 306

(56) References Cited

U.S. PATENT DOCUMENTS

| | | | | |
|---|---|---|---|---|
| 4,091,331 | * | 5/1978 | Kaser et al. ........................... | 375/327 |
| 5,271,041 | * | 12/1993 | Montreuil ............................... | 375/326 |
| 5,450,447 | * | 9/1995 | Dutta ..................................... | 375/344 |

OTHER PUBLICATIONS

Lee et al., A Hardware Efficient Phase/Gain Tracking Loop for the Grand Alliance VSB HDTV Receiver, IEEE Transactions on Consumer Electronics, vol. 42, No. 3, Aug. 1996, pp. 632–639.

* cited by examiner

*Primary Examiner*—Tesfaldet Bocure
(74) *Attorney, Agent, or Firm*—Birch, Stewart, Kolasch & Birch, LLP

(57) ABSTRACT

A phase error detector in a digital demodulator estimates phase error by dividing the difference between an in-phase demodulated signal and the transmitted data values included in the in-phase demodulated signal by the sum or difference of a quadrature demodulated signal and a product signal. The product signal is equal to the in-phase demodulated signal multiplied by a fixed gain constant. The phase error detector thereby obtains an error estimate that is substantially independent of the transmitted data values.

18 Claims, 11 Drawing Sheets

FIG. 14

PHASE ERROR DETECTOR

BACKGROUND OF THE INVENTION

The present invention relates to a phase error detector useful for carrier recovery and phase noise suppression in digital VSB (vestigial sideband) and QAM (quadrature amplitude modulation) demodulators.

Figure 1:
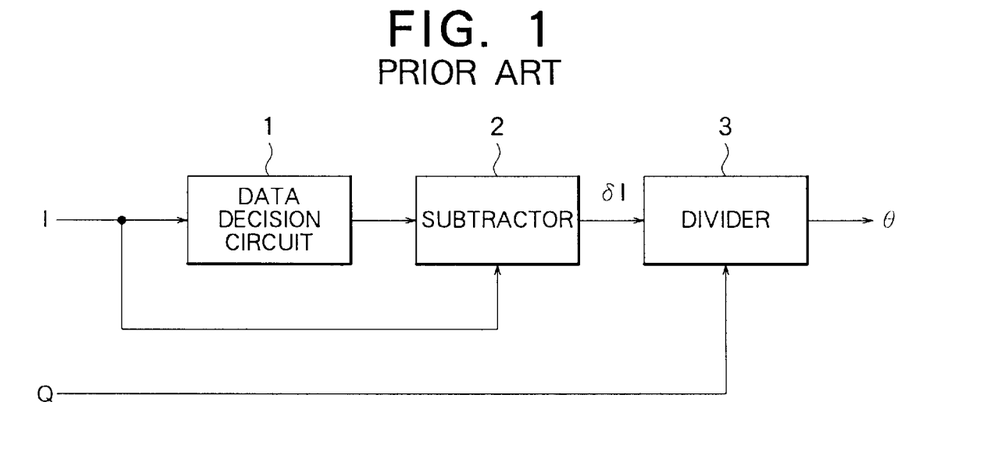
FIG. 1 is a block diagram of a conventional phase error detector.

As an example of the prior art, FIG. 1 shows a block diagram of a phase error detector proposed for use in demodulators in high-definition digital television receivers receiving a VSB signal. The I-signal or in-phase signal and Q-signal or quadrature signal are multi-level digital signals obtained by synchronous detection of the received VSB signal, using a pair of recovered carrier signals with mutually orthogonal phase, or using a recovered carrier signal and a filter such as a Hilbert filter. The I-signal includes the transmitted data, referred to as transmitted symbols, the values of which are determined by a data decision circuit 1. A subtractor 2 takes the difference δI between these values and the actual received levels of the I-signal. A divider 3 divides the difference (δI) by the Q-signal, thereby generating a phase error signal (θ) indicating the phase error between the recovered carrier signal and the carrier component of the received signal.

Figure 2:
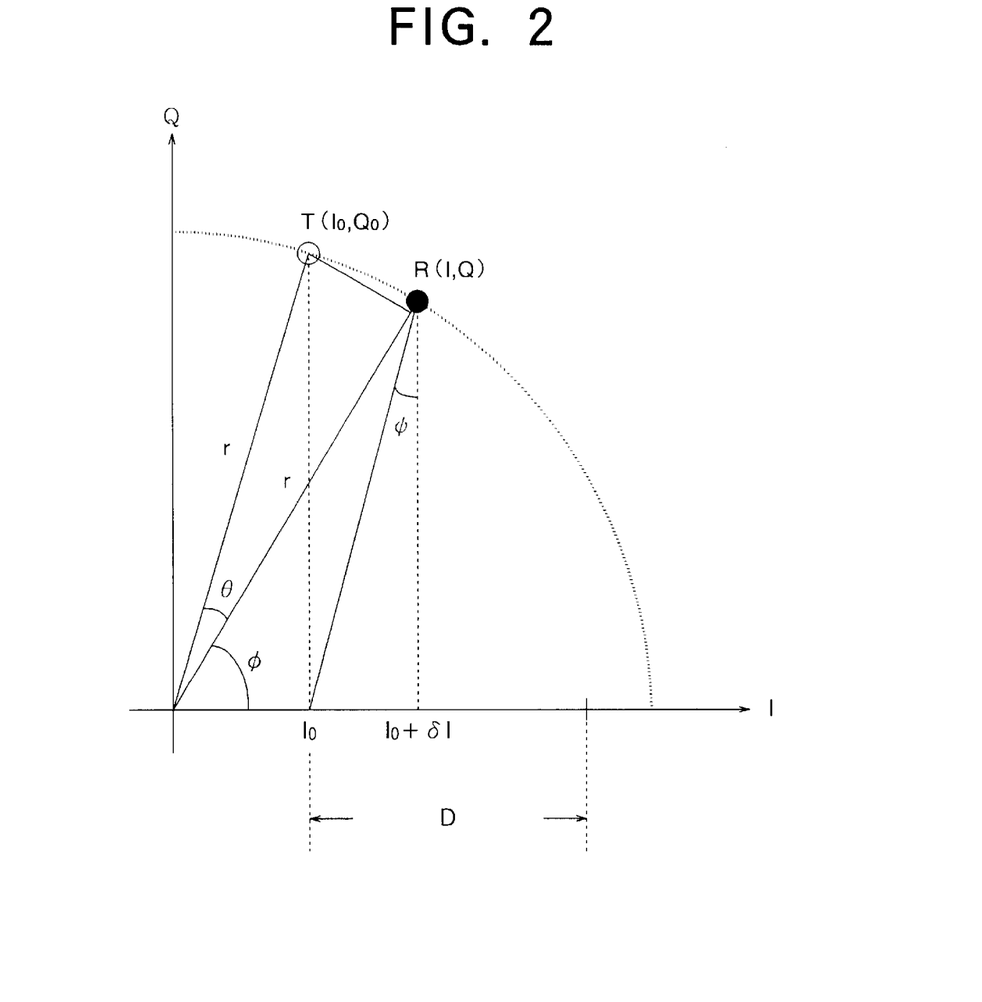
FIG. 2 is a graph illustrating the effect of phase error.

FIG. 2 illustrates the operation of this phase error detector with reference to an orthogonal I-Q coordinate system. R(I, Q) denotes a received symbol, the I and Q coordinates being the received levels of the I-signal and Q-signal during the symbol interval. A phase error of θ in the recovered carrier signal rotates R(I, Q) by a phase angle of θ from the actual transmitted symbol $T(I_0, Q_0)$, the rotation being clockwise with respect to the origin of the I-Q coordinate system. The I-coordinate of the received symbol, which should give the transmitted symbol value, is thereby moved by an amount δI from the true value $I_0$. Incorrect data will be obtained if δI exceeds one-half the distance D between adjacent symbol levels on the I-axis. The phase error detector in FIG. 1 estimates the phase error θ as δI/Q; that is, as the tangent of the angle ψ.

$$\theta \approx \tan \psi = \delta I/Q$$

In a carrier recovery circuit, the phase error detector forms part of a phase-locked loop (PLL) that corrects phase and frequency errors in the recovered carrier signal. In a phase noise suppression circuit, the phase error detector forms part of a PLL that corrects residual phase noise in the demodulated signals.

Figure 3:
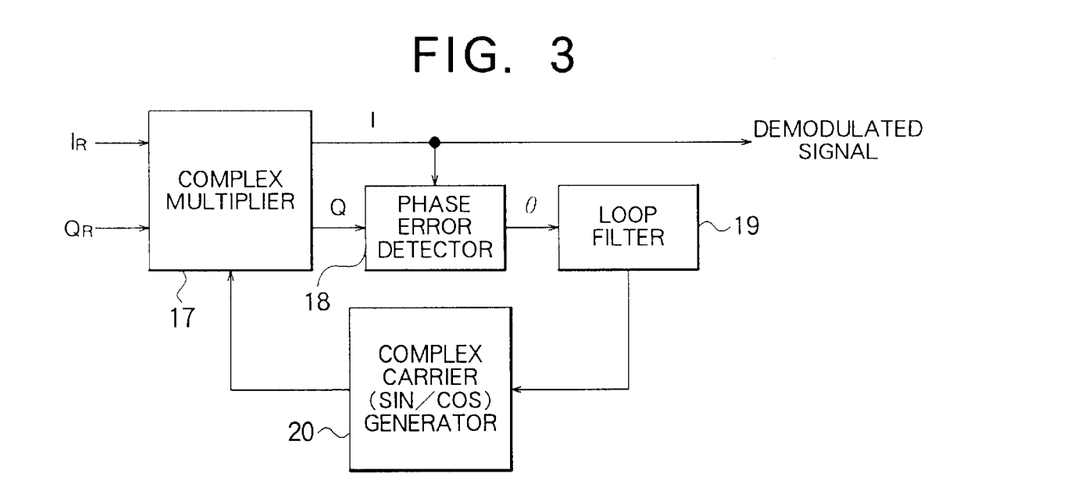
FIG. 3 is a block diagram of a phase-locked loop employing a phase error detector.

FIG. 3 shows a block diagram of a type of PLL used for both of these purposes. In carrier recovery, $I_R$ and $Q_R$ are the in-phase and quadrature components of a partially demodulated digital signal produced by semi-synchronous detection of the received signal with a recovered carrier signal that only approximately matches the received carrier phase and frequency. A complex multiplier 17 multiplies $I_R$ and $Q_R$ by a complex-valued signal to produce the I-signal and Q-signal input to the phase error detector 18. The phase error detector 18 generates a phase error signal θ. The loop filter 19 filters the phase error signal θ to remove unwanted high-frequency components while providing a suitable gain. The complex carrier generator 20 receives the filtered phase error signal and generates the complex-valued signal mentioned above, which is a digital signal having sine and cosine components. The phase and frequency of the complex-valued signal are adjusted according to the filtered phase error so that they match the phase and frequency error of the recovered carrier signal, enabling the complex multiplier 17 to complete the demodulation process. In a phase noise suppressor, $I_R$ and $Q_R$ are the completely demodulated in-phase and quadrature signals, and the complex-valued signal comprises the sine and cosine of the filtered phase error.

Figure 4:
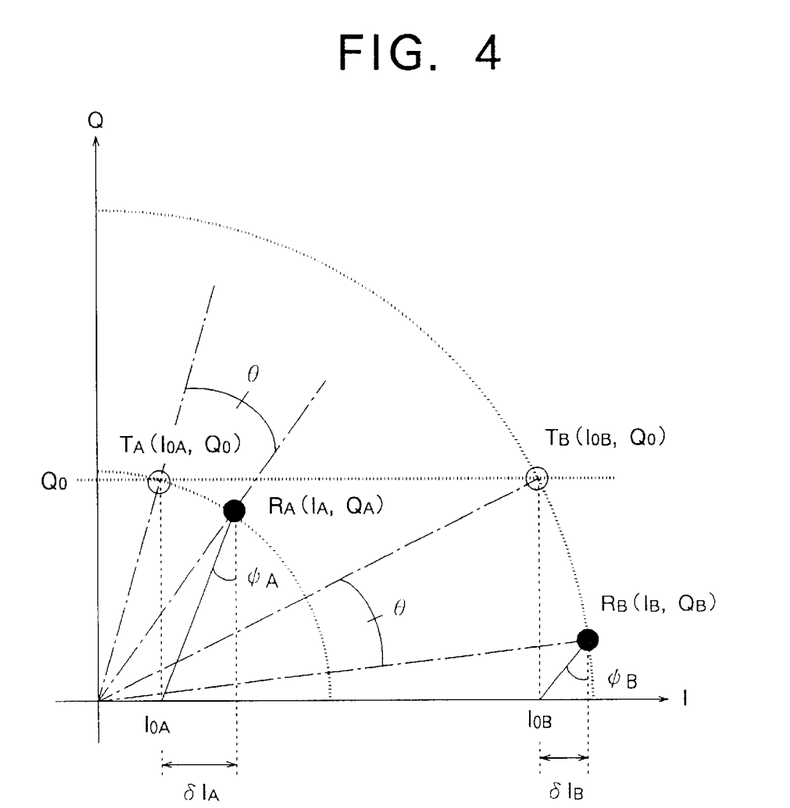
FIG. 4 is another graph illustrating the effect of phase error.

When the phase error detector shown in FIG. 1 functions as the phase error detector 18 in FIG. 3, its performance directly affects the error rate of the received data. A problem with the phase error detector in FIG. 1 is that the accuracy of the estimated phase error θ depends on the transmitted data. For a given real phase error, different transmitted data values can lead to very different error estimates. FIG. 4 shows an example in which transmitted symbols $T_A(I_{0A}, Q_0)$ and $T_B(I_{0B}, Q_0)$ are both received with identical phase errors. For simplicity, both have the same Q-coordinate $Q_0$. Application of the above approximation to these received symbols produces one estimate (tan $\psi_A$) for the phase error (θ) of $R_A(I_A, Q_A)$, and a much larger estimate (tan $\psi_B$) for the same phase error (θ) of $R_B(I_B, Q_B)$. The difference arises because the angle ψ is a function of the transmitted data value $I_0$, as shown by the following equation.

$$\psi = \tan^{-1}\{\tan(\theta) + [1/(Q \cos \theta) - 1/Q]I_0\}$$

Depending on the transmitted data, the prior art can lead to erratic PLL behavior, with adverse effects on carrier recovery and noise suppression.

In a QAM demodulator, both the I-signal and Q-signal include transmitted data. In addition to the problem described above, the phase error detector in FIG. 1 has the further problem of ignoring the independent information content of the Q-signal.

SUMMARY OF THE INVENTION

It is accordingly an object of the present invention to obtain an estimate of phase error that does not vary greatly depending on the transmitted data.

Another object is to provide a phase error detector that can be used in both VSB and QAM demodulators.

In a demodulator using a recovered carrier signal to obtain an in-phase demodulated signal and a quadrature demodulated signal from a received signal, the invented method of estimating phase error comprises the steps of:

determining transmitted data values represented by the in-phase demodulated signal;

taking the difference between the in-phase demodulated signal and the transmitted data values;

using the resulting difference signal and the quadrature demodulated signal to estimate the sign of the phase error;

multiplying the in-phase demodulated signal by a constant gain;

reversing the polarity of the resulting product signal, depending on the estimated sign of the phase error;

adding the resulting signed product signal to the quadrature demodulated signal; and dividing the resulting sum into the above-mentioned difference signal, thereby estimating the phase error.

When the quadrature demodulated signal also includes transmitted data, the invented method uses the above steps to obtain a first estimated phase error, uses similar steps with the roles of the in-phase and quadrature demodulated signals reversed to obtain a second estimated phase error, then takes the average of the first estimated phase error and the second estimated phase error.

The invention also provides phase detectors that carry out the steps described above.

DETAILED DESCRIPTION OF THE INVENTION

Embodiments of the invention will be described with reference to the attached drawings, in which like parts are indicated by like reference characters. The inputs to these embodiments are an in-phase signal or I-signal and a quadrature signal or Q-signal obtained by demodulating a received signal with a recovered carrier signal, as in the prior art. The I-signal and Q-signal are both multi-level digital signals.

Figure 5:
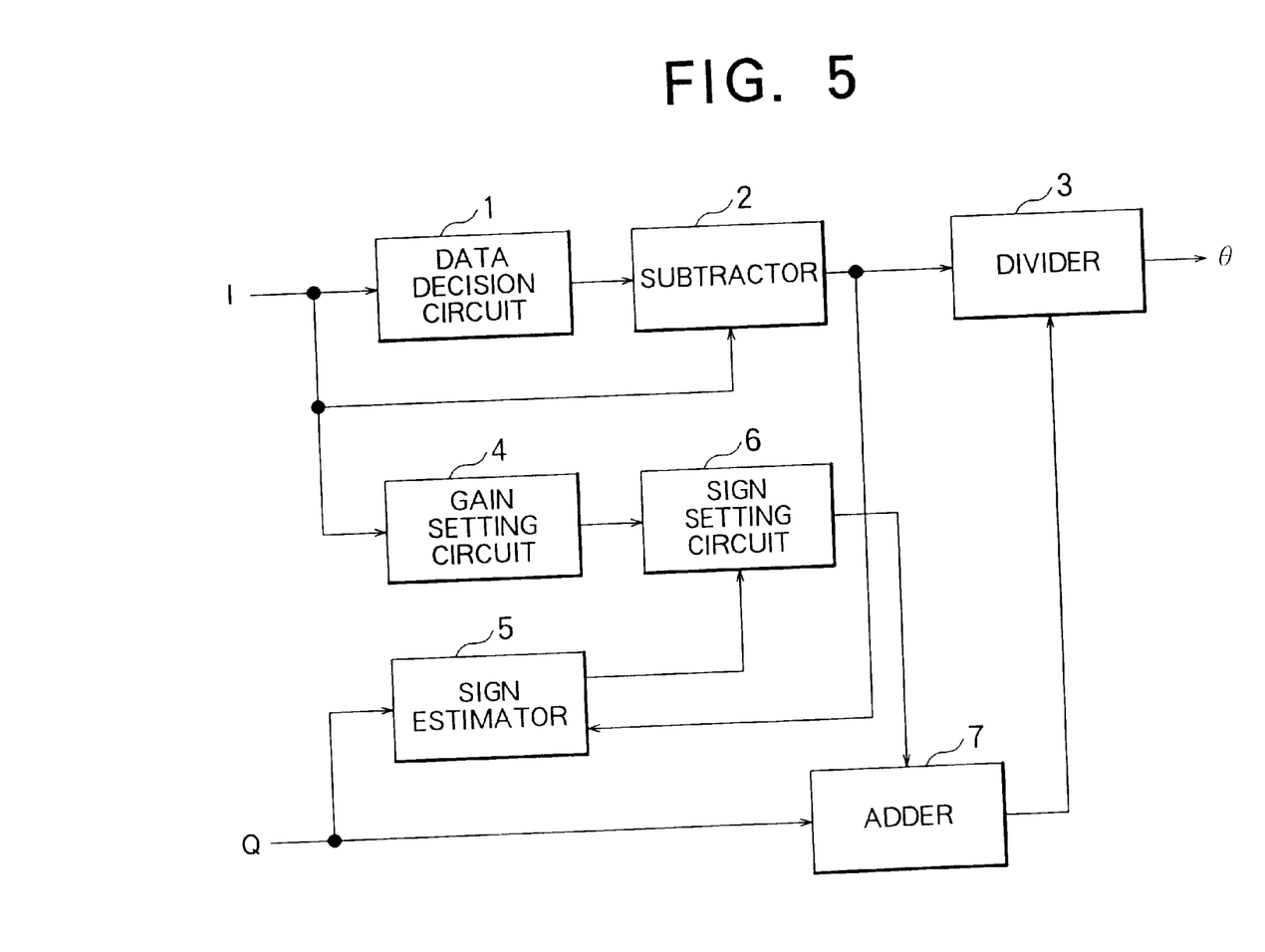
FIG. 5 is a block diagram illustrating a first embodiment of the invention.

Referring to FIG. 5, a first embodiment of the invention comprises a data decision circuit 1 and a subtractor 2 that operate on the received I-signal as already described, the data decision circuit 1 determining the transmitted data value represented by the I-signal, and the subtractor 2 subtracting the determined data value from the actual level of the I-signal to obtain a difference signal $\delta I$. A divider 3 divides $\delta I$ by a divisor derived from both the I- and Q-signals. A gain setting circuit 4 multiplies the I-signal by a fixed gain constant $\alpha$, and outputs the resulting product signal. A sign estimator 5 receives the Q-signal and the difference signal $\delta I$, estimates the sign of the phase error, and outputs a sign signal comprising binary data representing the estimated sign. The estimated sign indicates whether the recovered carrier signal leads or lags the correct phase. A sign setting circuit 6 attaches the estimated sign to the product signal output by the gain setting circuit 4, reversing the polarity of the product signal when the sign estimated by the sign estimator 5 is negative. An adder 7 adds the signed product signal output by the sign setting circuit 6 to the Q-signal to produce the divisor supplied to the divider 3. The output of the divider 3 is the estimated phase error $\theta$.

Next, the theory of operation of the first embodiment will be described, with reference again to FIG. 2, in which the letter 'r' represents the distance of the transmitted symbol value $T(I_0, Q_0)$ from the origin of the I-Q coordinate system, $\phi$ represents the phase angle of the received symbol R(I, Q) with respect to the I-axis, and $\theta$ is the phase error.

The I-coordinate $I_0$ of the transmitted symbol T is given in terms of r, $\theta$, and $\phi$ by the following equation.

$$I_0 = r \cdot \cos(\theta + \phi)$$

If the phase error $\theta$ is not large, its sine and cosine can be approximated as follows.

$$\sin \theta \approx \theta$$

$$\cos \theta \approx 1 - \alpha|\theta|$$

The constant $\alpha$ is a positive constant less than one, chosen as described below according to the anticipated range of phase errors, the anticipated range not exceeding the range from $-\pi/2$ to $\pi/2$.

With these approximations, the equation for $I_0$ can be used to obtain the following approximate equality.

$$Q\theta + \alpha I|\theta| \approx \delta I$$

When the phase error $\theta$ is positive or zero, this yields the following approximation.

$$\theta \approx \delta I / (Q + \alpha I)$$

When the phase error $\theta$ is negative, the following approximation is obtained.

$$\theta \approx \delta I / (Q - \alpha I)$$

Accordingly, if the sign of the phase error can be estimated, the formulas above give an estimate for the magnitude of the phase error in terms of the received I and Q values and the data value determined by the data decision circuit 1.

The constant a represents a typical absolute value of the slope of the cosine function ($\cos \theta$) over the expected range of the phase error $\theta$. The appropriate value of the constant a depends on the purpose for which the phase error detector is used. In phase noise suppression, the anticipated phase errors $\theta$ are small, and $\alpha$ should be small. In carrier recovery, larger phase errors can be anticipated, so a comparatively larger value of $\alpha$ should be used, to give usable approximations when the absolute value of $\theta$ is close to $\pi/2$, even though the accuracy of the approximation at values of $\theta$ near zero is somewhat reduced. To simplify the computation of $\alpha I$, $\alpha$ is preferably the reciprocal of a power of two.

Next, the operation of the first embodiment will be described. The data decision circuit 1 estimates the transmitted data included in the I-signal, by making a firm or 'hard' decision on the transmitted value of the I-signal at each symbol. The subtractor 2 takes the difference between this value ($I_0$) and the value actually received (I), thereby obtaining the difference $\delta I$ (equal to I–$I_0$). The gain setting circuit 4 multiplies the actual received value (I) by the constant $\alpha$. The sign estimator 5 estimates the sign of the phase error as described below. The estimated sign is attached to the output ($\alpha I$) of the gain setting circuit 4 to obtain $\alpha I$ or $-\alpha I$. The adder 7 adds the Q-signal to the result, obtaining $Q+\alpha I$ or $Q-\alpha I$. By dividing this quantity ($Q\pm\alpha I$) into the difference ($\delta I$), the divider 3 obtains the estimated phase error.

Figure 6:
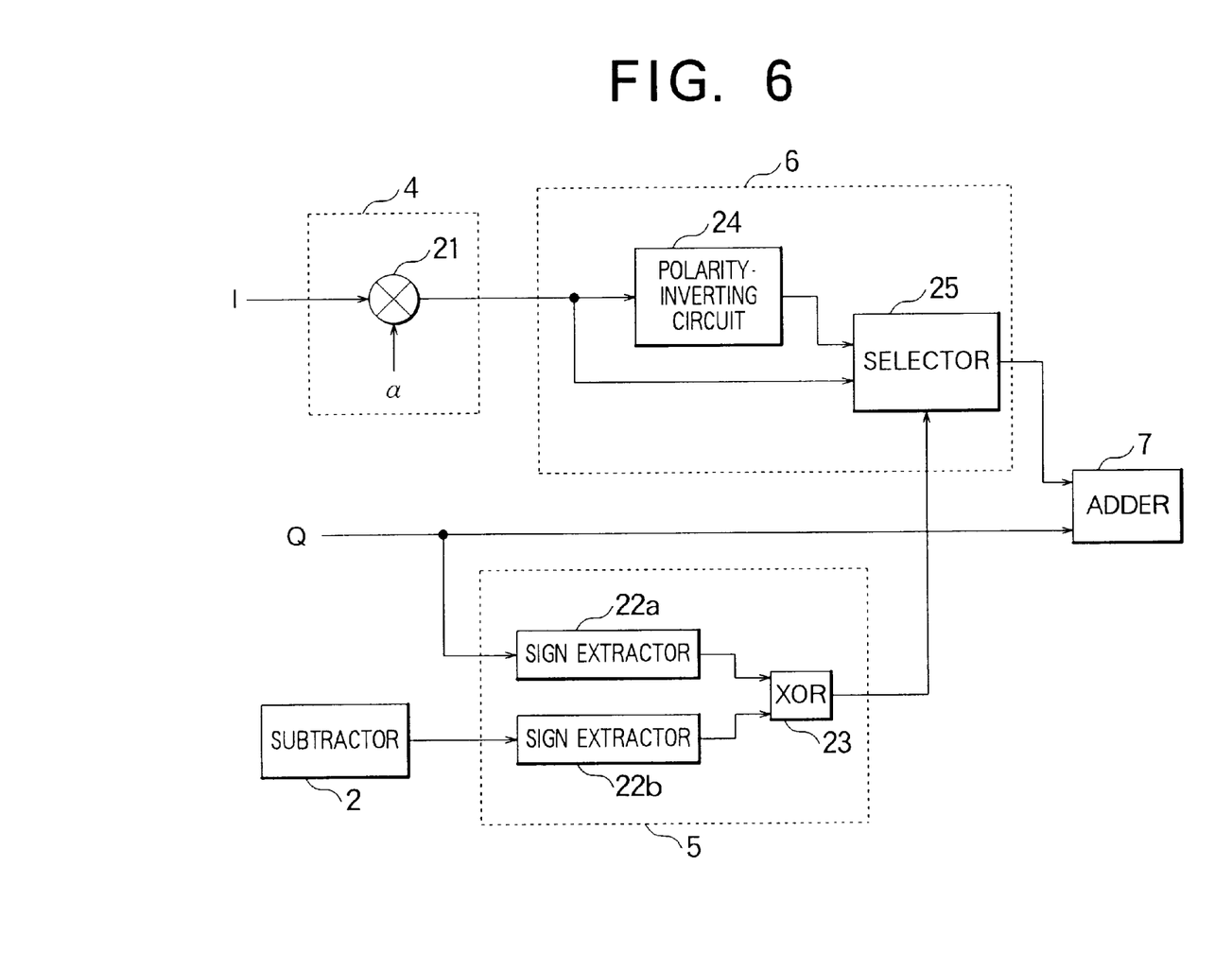
FIG. 6 is a more detailed block diagram illustrating the internal structure of the gain setting circuit, sign estimator, and sign setting circuit in FIG. 5.

FIG. 6 shows the internal structure of the gain setting circuit 4, sign estimator 5, and sign setting circuit 6. The gain setting circuit 4 comprises a multiplier 21 that multiplies the I-signal by the constant α. The sign estimator 5 comprises a pair of sign extractors 22a and 22b that obtain the algebraic sign bits of the Q-signal and the difference δI, respectively, and an exclusive-OR (XOR) gate 23 that takes the logical exclusive OR of the two algebraic signs. The phase error θ is thus estimated to be positive if δI and Q have the same sign, and negative if δI and Q have different signs. The sign setting circuit 6 comprises a polarity-inverting circuit 24 that takes the two's complement of the product (αI) output by the gain setting circuit 4, and a selector 25. The selector 25 selects this product (αI) when the output of the exclusive-OR gate 23 is high, indicating that the phase error is positive or zero, and selects the inverted product (−αI) when the output of the exclusive-OR gate 23 is low, indicating a negative phase error. The adder 7 receives the Q signal and the output of the selector 25.

If α is a reciprocal power of two, the gain setting circuit 4 can structured as a bit shifter that performs a fixed bit shift. Similarly, the divider 3 can be structured as a bit shifter that performs a bit shift responsive to the output of the adder 7, thereby dividing the difference δI by the power of two that best approximates the output of the adder 7.

Figure 7:
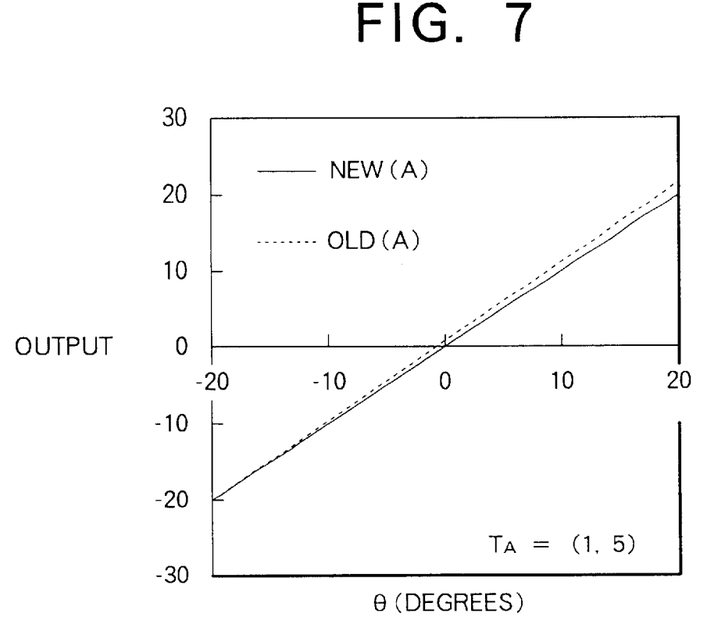
FIG. 7 is a graph comparing the performance of the first embodiment with the performance of a conventional phase error detector.
Figure 8:
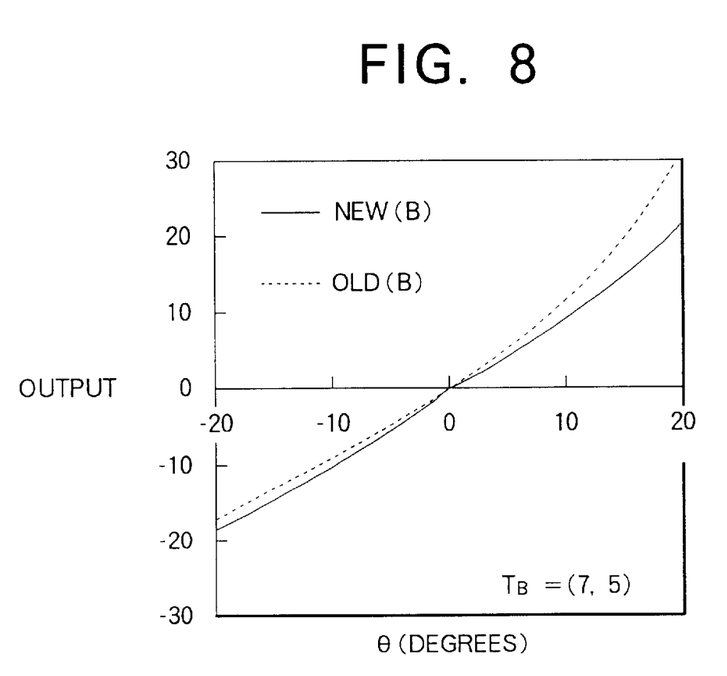
FIG. 8 is another graph comparing the performance of the first embodiment with the performance of the conventional phase error detector.

FIGS. 7 and 8 show the results of simulations of the performance of the first embodiment and the prior art. The simulated phase error is indicated in degrees on the horizontal axis. The value estimated by the phase error detector is indicated in degrees on the vertical axis. The solid line (new) indicates the output of the first embodiment. The dotted line (old) indicates the output of the phase error detector shown in FIG. 1.

In FIG. 7, the transmitted data value $T_A$ is (1, 5); in FIG. 8, the transmitted data value $T_B$ is (7, 5). Whereas the output characteristic of the prior-art phase error detector differs considerably between these two data values, the output characteristic of the first embodiment is substantially the same for both data values, and is more nearly linear than the prior-art characteristic, especially in FIG. 8. The first embodiment thus solves the problem of the prior art and provides a phase error signal that enables accurate carrier recovery and accurate suppression of phase noise, regardless of the value of the transmitted data.

Next, a second embodiment will be described. The second embodiment is useful when the transmitted signal includes known data, such as synchronization symbols, occurring at known times in the transmitted data sequence.

Figure 9:
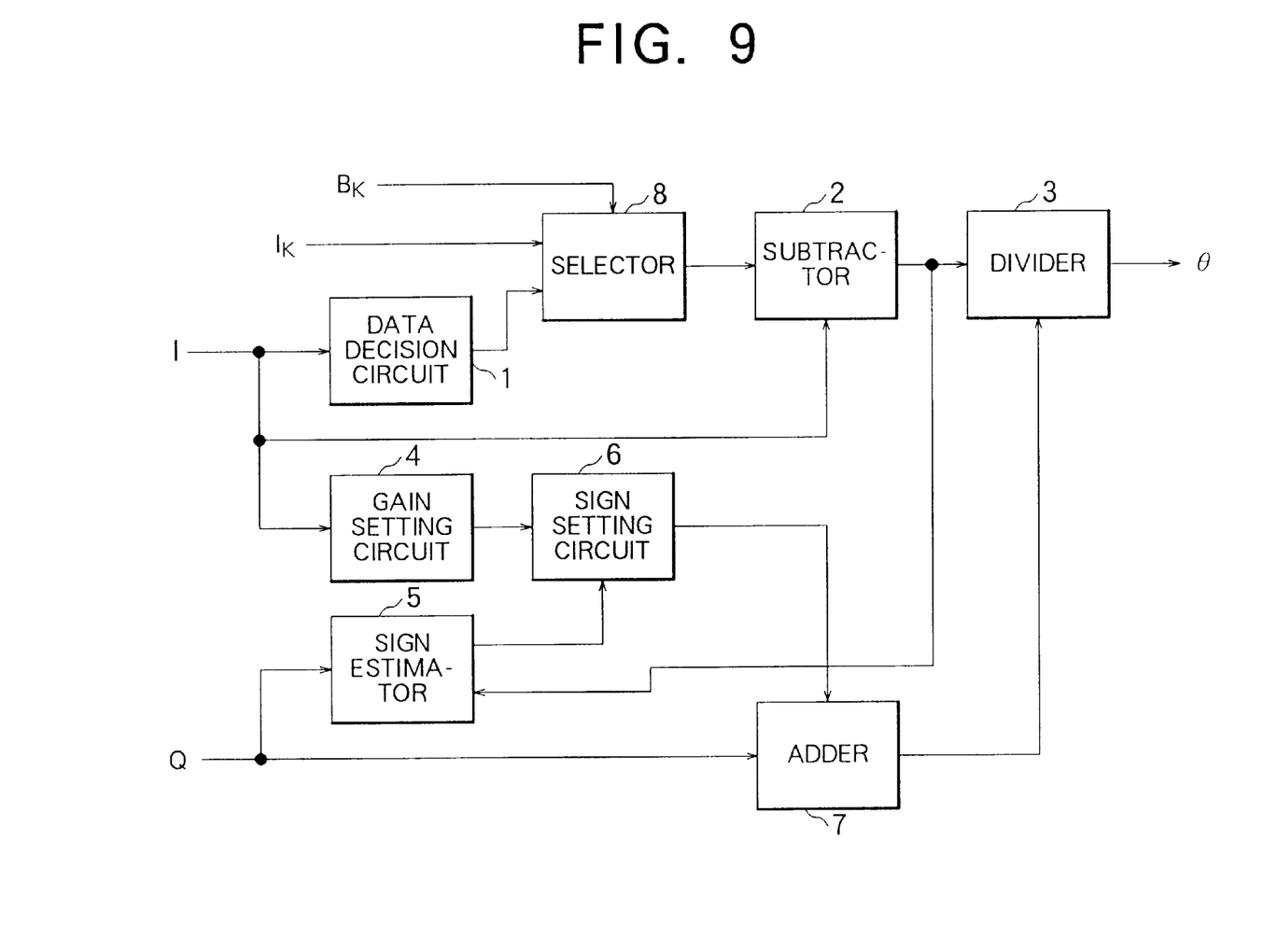
FIG. 9 is a block diagram illustrating a second embodiment of the invention.

Referring to FIG. 9, the second embodiment includes the same elements 1 to 7 as the first embodiment, and an additional selector 8. The selector 8 receives the output of the data decision circuit 1. The selector 8 also receives a known data sequence $I_K$, and a binary signal $B_K$ indicating the intervals of time during which the known data sequence is present in the received signal. During these intervals, the selector 8 supplies the known data to the subtractor 2. At other times, the selector 8 supplies the output of the data decision circuit 1 to the subtractor 2.

When the known data sequence is not being received, the second embodiment operates in the same way as the first embodiment. When the known data sequence is being received, the subtractor 2 takes the difference between the received data and the known data, instead of the difference between the received data and the data values determined by the data decision circuit 1. While the known data sequence is being received, accordingly, the second embodiment operates reliably even if some of the data values obtained by the data decision circuit 1 are incorrect due to noise or distortion in the received signal.

Next, a third embodiment will be described. The third embodiment includes a further countermeasure to noise and distortion in the received signal.

Figure 10:
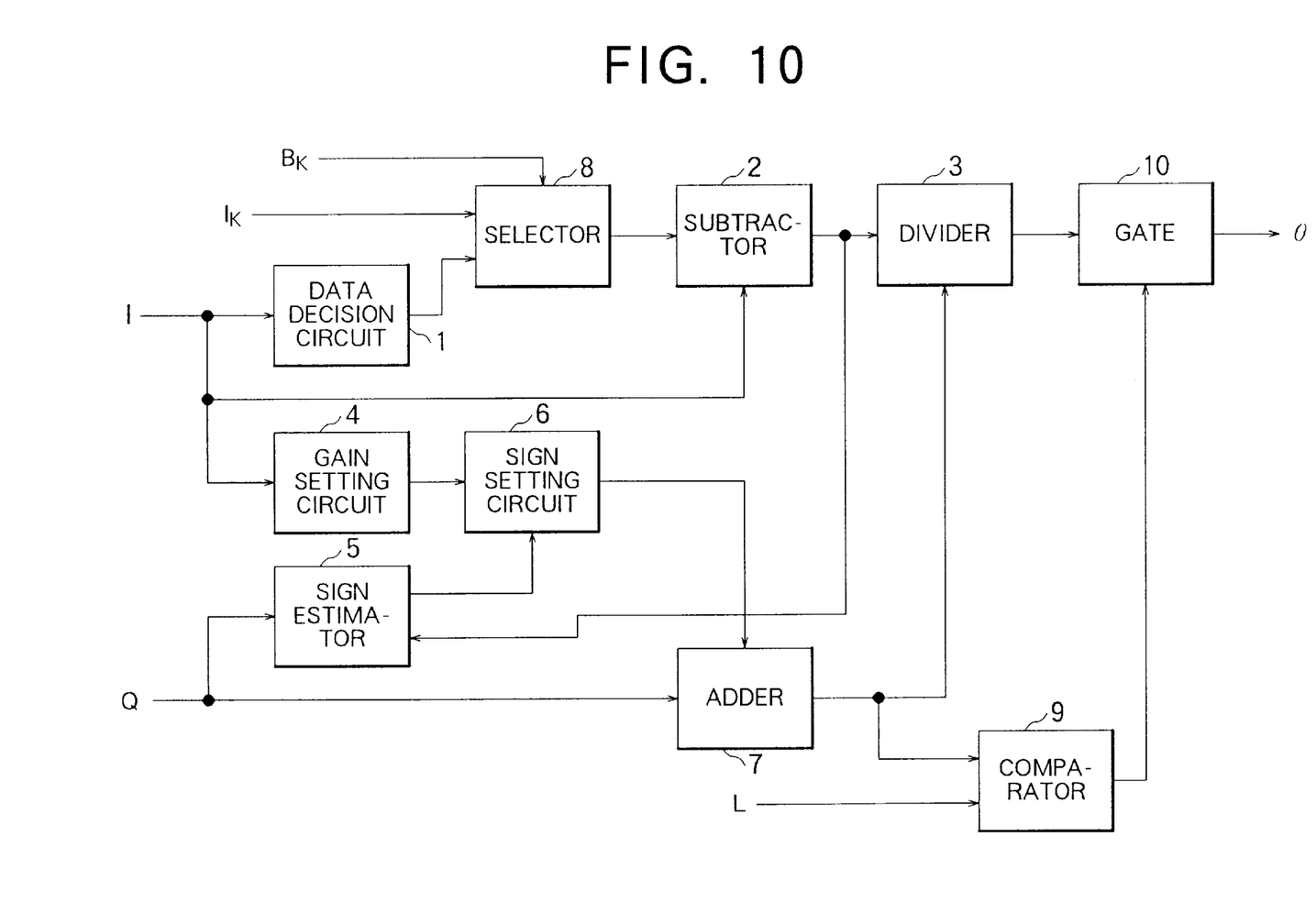
FIG. 10 is a block diagram illustrating a third embodiment of the invention.

Referring to FIG. 10, the third embodiment comprises the same elements 1 to 8 as the second embodiment, and an additional comparator 9 and gate circuit 10. The comparator 9 compares the absolute value of the output of the adder 7 with a predetermined threshold value L, and sends the gate circuit 10 a binary signal indicating the result of the comparison. In response to this signal, when the absolute value of the output of the adder 7 is equal to or greater than the threshold value L, the gate circuit 10 outputs the phase error determined by the divider 3. When the absolute value of the output of the adder 7 is less than the threshold value L, the gate circuit 10 outputs a fixed phase error value of zero.

Noise and distortion in the received I- and Q-signals reduce the reliability of the detected phase error generally, but the adverse effect on PLL control in carrier recovery and phase noise suppression is especially large when the polarity of the phase noise is detected incorrectly; that is, when the polarity of the output of the adder 7 is incorrect. The smaller the absolute value of the output of the adder 7 is, the more likely it becomes that noise or distortion may have reversed the polarity of this output.

By setting the detected phase error to zero when the output of the adder 7 is small, the third embodiment prevents the false detection of large phase errors with the wrong polarity, thereby limiting the adverse effects of noise and distortion. With an appropriate value of the threshold L, the adverse effect of incorrect sign estimates can be substantially eliminated. The problem of division by zero is also avoided.

In a variation of the third embodiment, when the comparator 9 finds that the output of the adder 7 is less than the threshold value L, the gate circuit 10 multiplies the estimated phase error by a fixed gain, less than unity, to reduce the absolute value of the estimated phase error. The fixed gain is preferably a reciprocal power of two, so that the gate circuit 10 can operate by performing a bit shift.

Next, a fourth embodiment will be described. The fourth embodiment clips the detected phase error unconditionally.

Figure 11:
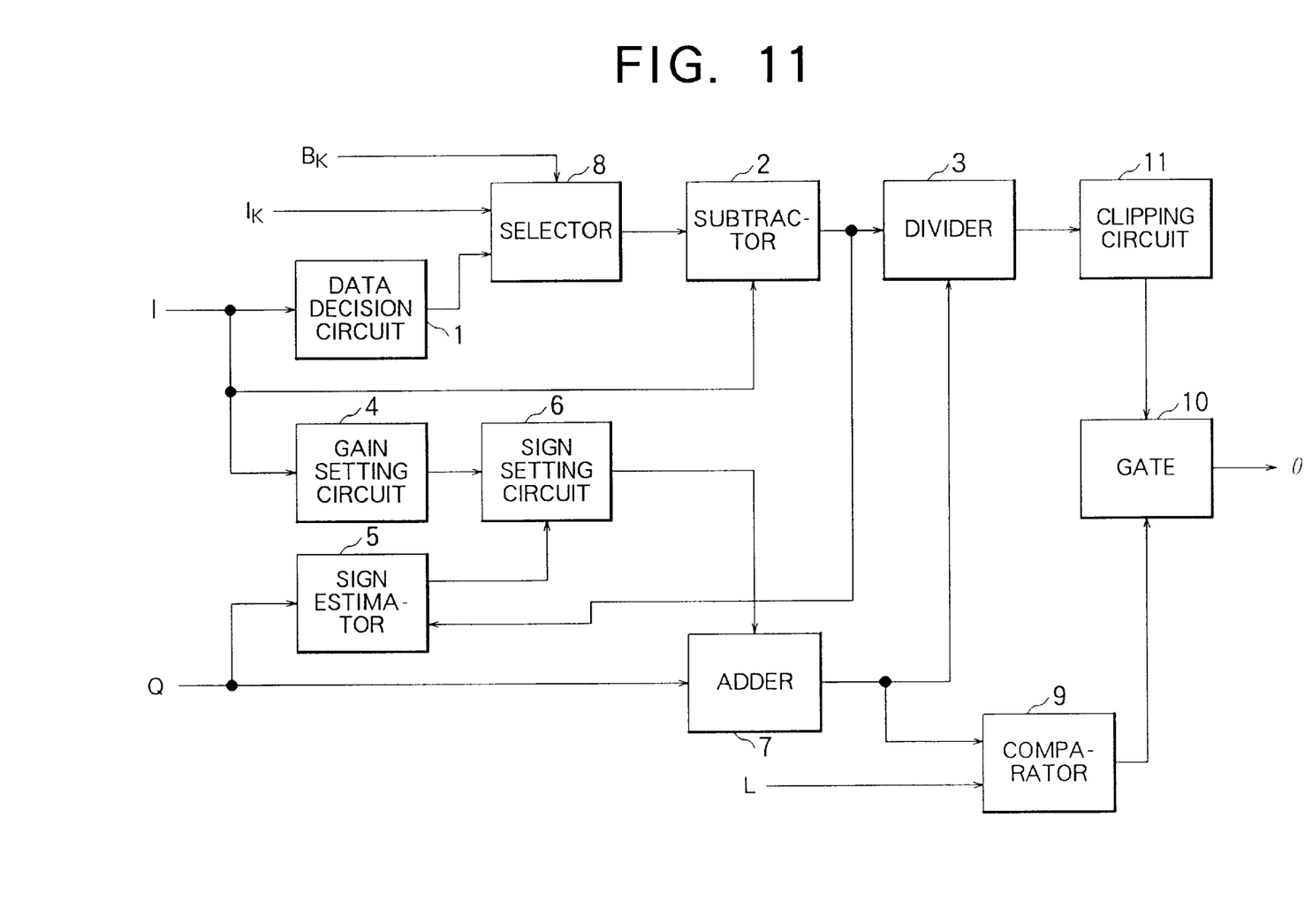
FIG. 11 is a block diagram illustrating a fourth embodiment of the invention.

Referring to FIG. 11, the fourth embodiment comprises the elements 1 to 10 of the third embodiment, and an additional clipping circuit 11 that clips the output of the divider 3 before input to the gate circuit 10. If the absolute value of the phase error output by the divider 3 is equal to or less than a predetermined clipping threshold, the clipping circuit 11 leaves the phase error value unchanged. If the absolute value of the phase error is greater than the clipping threshold, the clipping circuit 11 attaches the sign of the phase error to the clipping threshold, and outputs the resulting value.

By clipping the output of the divider 3, the clipping circuit 11 limits the effect of noise and distortion on the detected phase error, regardless of whether the output of the adder 7 is larger or smaller than the threshold L.

Next, a fifth embodiment will be described. The fifth embodiment smoothes the output of the divider 3, instead of clipping.

Figure 12:
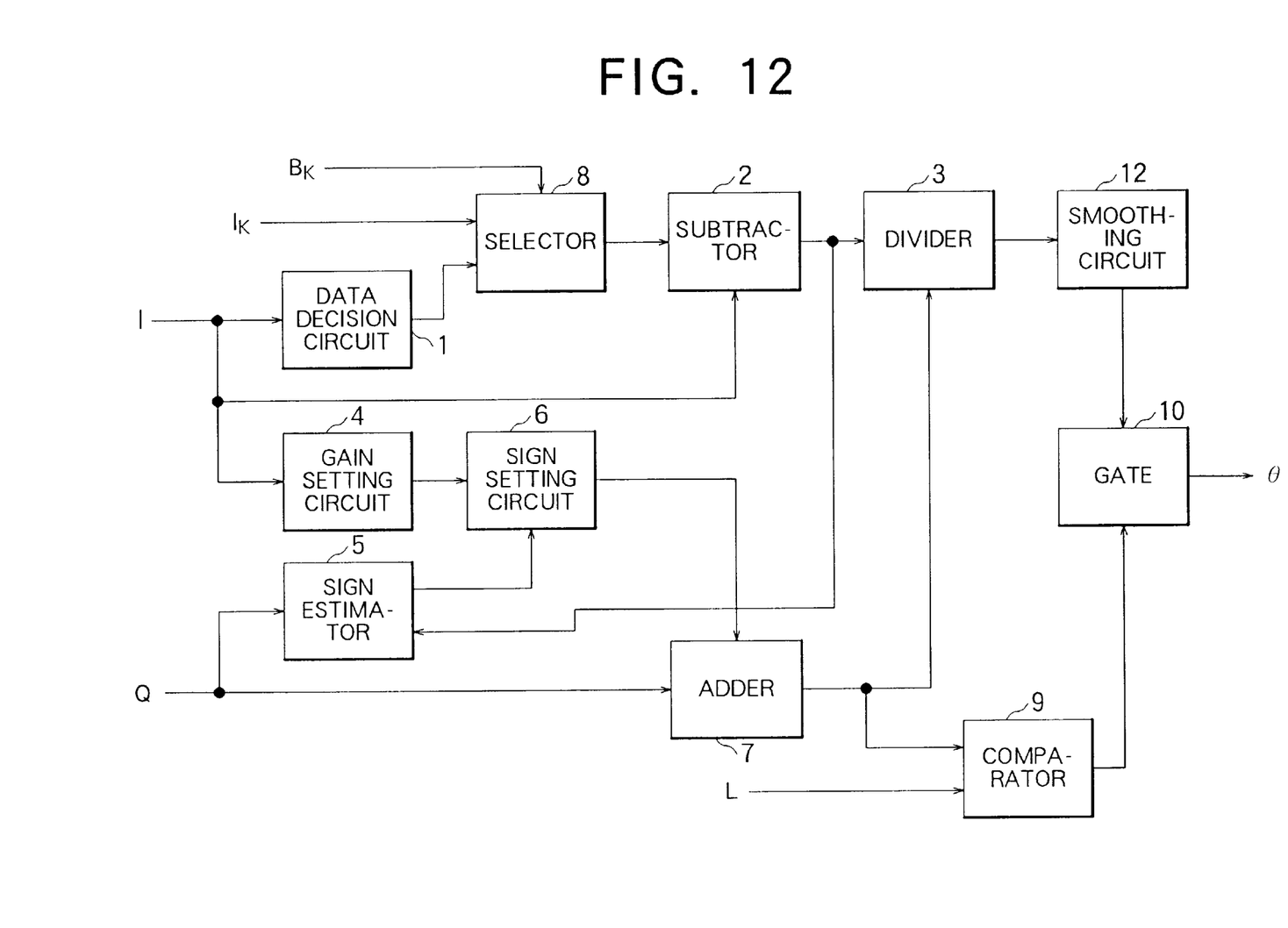
FIG. 12 is a block diagram illustrating a fifth embodiment of the invention.

Referring to FIG. 12, the fifth embodiment comprises the elements 1 to 10 of the third embodiment, and an additional smoothing circuit 12 that smoothes the output of the divider 3 before input to the gate circuit 10. Various smoothing methods can be employed, depending on the expected characteristics of the phase error. As one example, the smoothing circuit 12 observes the average rate of change of the estimated phase error output by the divider 3 over an interval surrounding the current symbol. If the output of the divider 3 changes abruptly, causing the change at the current symbol to depart greatly from the average change in the surrounding interval, the smoothing circuit 12 replaces the estimated phase error at the current symbol with the estimated phase error at the previous symbol, or with the estimated phase error at the previous symbol plus the average change in the surrounding interval.

By smoothing the output of the divider 3, the smoothing circuit 12 eliminates transient noise effects. The smoothing circuit 12 is particularly useful in carrier recovery.

Next, a sixth embodiment will be described. The sixth embodiment operates in two modes, depending on whether the received signal is a VSB signal or a QAM signal.

Figure 13:
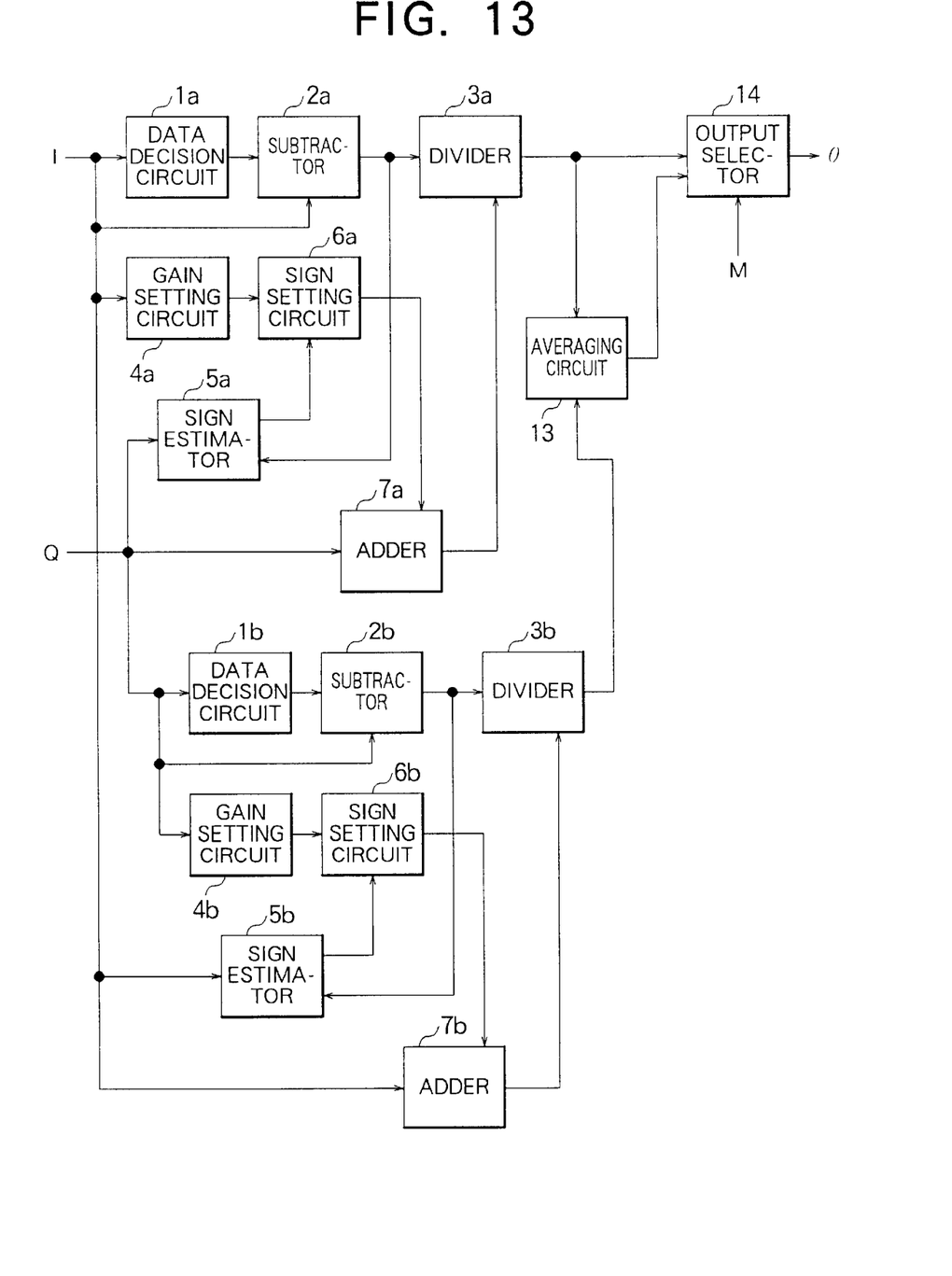
FIG. 13 is a block diagram illustrating a sixth embodiment of the invention.

Referring to FIG. 13, the sixth embodiment comprises a data decision circuit 1a, a subtractor 2a, a divider 3a, a gain setting circuit 4a, a sign estimator 5a, a sign setting circuit 6a, and an adder 7a that are identical to the data decision circuit 1, subtractor 2, divider 3, gain setting circuit 4, sign estimator 5, sign setting circuit 6, and adder 7 in the first embodiment. The sixth embodiment also comprises a data decision circuit 1b, a subtractor 2b, a divider 3b, a gain setting circuit 4b, a sign estimator 5b, a sign setting circuit 6b, and an adder 7b, which operate substantially as described in the first embodiment, but with the roles of the I-signal and Q-signal reversed. The elements having reference characters with a 'b' suffix operate when the received signal is a QAM signal. The Q-signal is supplied to the data decision circuit 1b, subtractor 2b, and gain setting circuit 4b, and the I-signal to the sign estimator 5b and adder 7b. The adder 7b subtracts the I-signal from output of the sign setting circuit 6b, by taking the two's complement of the I-signal before performing an addition operation.

In addition, the sixth embodiment comprises an averaging circuit 13 and an output selector 14. The averaging circuit 13 takes the average value of the two phase-error values output by the divider 3a and divider 3b to produce an averaged phase error. The output selector 14 selects either the phase error output by the divider 3a or the averaged phase error output by the averaging circuit 13, according to a mode signal M. The signal selected by the output selector 14 becomes the output phase error signal θ.

The mode signal M indicates whether the received signal is a VSB signal or a QAM signal. When the received signal is a VSB signal, the output selector 14 selects the phase error signal output by the divider 3a, and the sixth embodiment operates in the same way as the first embodiment.

When the received signal is a QAM signal, the output selector 14 selects the averaged phase error output by the averaging circuit 13. Referring again to FIG. 2, the Q-coordinate of the transmitted signal $T(I_0, Q_0)$ has the following value.

$$Q_0 = r \cdot \sin(\theta + \phi)$$

If the phase error θ is sufficiently small, the approximations to the sine and cosine functions given earlier can be used to obtain the following approximate equality, where δQ is the difference $(Q-Q_0)$ between the received and transmitted Q-coordinates.

$$-I\theta + \alpha Q|\theta| \approx \delta Q$$

When the phase error θ is positive or zero, this yields the following approximation.

$$\theta \approx \delta Q/(-I+\alpha Q)$$

When the phase error θ is negative, the following approximation is obtained.

$$\theta \approx \delta Q/(-I+\alpha Q)$$

When the received signal is a QAM signal, the data decision circuit 1b determines the value of the data transmitted in the Q-signal. The subtractor 2b subtracts this value from the received value of the Q-signal to obtain the difference δQ. The gain setting circuit 4b multiplies the Q-signal by the constant α. The sign estimator 5b estimates the sign of the phase error by performing, for example, an exclusive-NOR logical operation on the algebraic sign of the difference δQ and the algebraic sign of the I-signal. The sign of the phase error is estimated to be positive if I and δQ have different signs, and negative if they have the same sign. The sign setting circuit 6b attaches the estimated sign to the product (αQ) output by the gain setting circuit 4b. The adder 7b subtracts the I-signal from the result, by adding the two's complement of the I-signal, thereby obtaining −I+αQ when the phase error is estimated to be positive, and −I−αQ when the phase error is estimated to be negative. The divider 3b divides this quantity into the difference δQ to estimate the phase error.

In the absence of noise and distortion, the estimated phase error output by the divider 3b will substantially agree with the estimated phase error output by the divider 3a, and both will substantially match the averaged phase error produced by the averaging circuit 13. When noise or distortion is present, use of the averaged phase error signal reduces the effect of the noise or distortion on the final phase error output signal θ.

Next, a seventh embodiment will be described. The seventh embodiment also operates in both VSB and QAM modes.

Figure 14:
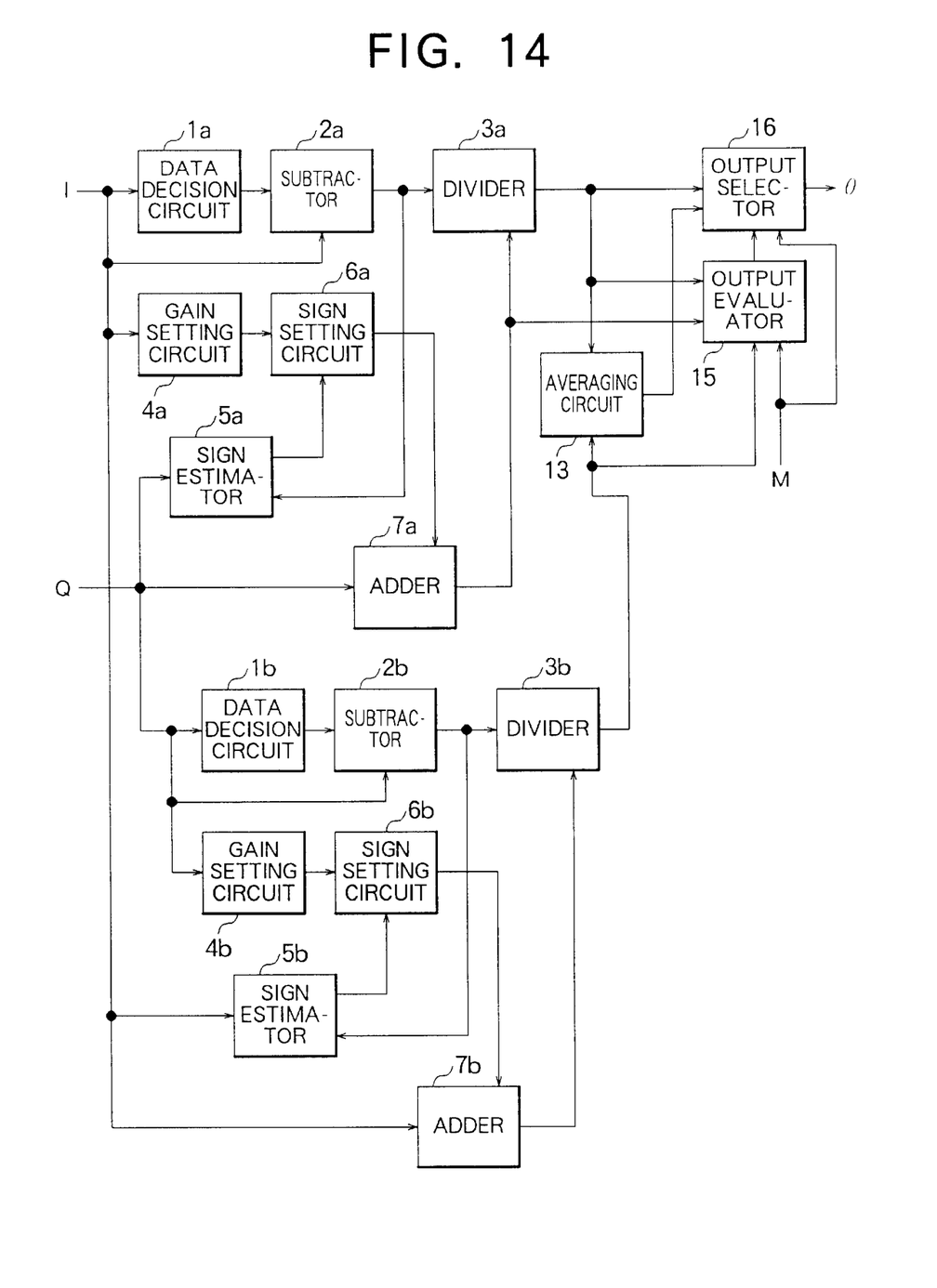
FIG. 14 is a block diagram illustrating a seventh embodiment of the invention.

Referring to FIG. 14, the seventh embodiment comprises the elements 1a, 2a, 3a, 4a, 5a, 6a, 7a, 1b, 2b, 3b, 4b, 5b, 6b, 7b, and 13 of the sixth embodiment, an additional output evaluator 15, and an output selector 16. The mode signal M differentiating between the VSB and QAM modes is supplied to both the output evaluator 15 and the output selector 16. The output evaluator 15 evaluates the reliability of the estimated phase error on the basis of the mode signal M and the outputs of the divider 3a, divider 3b, and adder 7a, and supplies a reliability evaluation signal having at least two values to the output selector 16. The output selector 16 generates the output phase error signal θ from the mode signal M, the reliability evaluation signal output by the output evaluator 15, and the output of the divider 3a or averaging circuit 13.

When the mode signal M indicates the VSB mode, the output evaluator 15 evaluates the reliability of the phase error signal output by the divider 3a according to the absolute value of the divisor output by the adder 7a, as in the third embodiment. If the reliability evaluation signal has only two possible values, the output evaluator 15 compares the output of the adder 7a with a single threshold value L. If the reliability evaluation signal has more then two possible value, the output evaluator 15 compares the output of the adder 7a with more than one threshold to obtain a reliability evaluation. When the output evaluator 15 outputs a signal indicating maximum reliability, the output selector 16 outputs the phase error signal as received from the divider 3a. When the output evaluator 15 outputs a signal indicating minimum reliability, the output selector 16 outputs a value indicating zero phase error. If the output evaluator 15 outputs a signal indicating an intermediate level of reliability, the output selector 16 multiplies the output of the divider 3a by a positive gain constant less than one, or performs an equivalent bit shift, and outputs the result.

When the mode signal M indicates the QAM mode, the output evaluator 15 evaluates the reliability of the averaged phase error output by the averaging circuit 13 according to, for example, the absolute value of the difference between the outputs of the divider 3a and divider 3b. The output evaluator 15 can compare this absolute value with one threshold to generate a two-valued reliability evaluation, or with two or more thresholds to generate a reliability evaluation with more than two possible values. When the output evaluator 15 outputs a signal indicating maximum reliability, the output selector 16 outputs the averaged phase error signal as received from the averaging circuit 13. When the output evaluator 15 outputs a signal indicating minimum reliability, the output selector 16 outputs a value indicating zero phase error. If the output evaluator 15 outputs a signal indicating an intermediate level of reliability, the output selector 16 multiplies the output of the averaging circuit 13 by a positive gain constant less than one, or performs an equivalent bit shift, and outputs the result.

By evaluating the reliability of the outputs of the divider 3a and averaging circuit 13 as described above, and making suitable modifications to the output phase error, the seventh embodiment can avoid the output of large, unreliable phase-error values, in both the VSB and QAM modes of operation.

All of the embodiments described above provide an estimated phase error value that is substantially independent of the transmitted data values. In addition, the second embodiment makes use of known data, when available, to improve the reliability of the estimate. The third embodiment predicts the reliability of the estimated phase error, and reduces estimated phase error values considered to be unreliable. The fourth embodiment clips the estimated phase error values unconditionally, eliminating unreasonably large estimated values. The fifth embodiment smoothes the output of the phase detector, to reduce noise effects. The sixth embodiment operates in both a VSB and a QAM mode. The seventh embodiment operates in both a VSB mode and a QAM mode, predicts the reliability of the estimated phase error output in either mode, and modifies unreliable values.

The above features of the second to seventh embodiments can be used individually, or in various combinations, including combinations other than the ones shown in the embodiments.

The invention can be practiced by means of separate hardware circuits as indicated in the block diagrams, or by a suitably-programmed general-purpose processor such as a digital signal processor.

Those skilled in the art will recognize that further variations are possible within the scope claimed below.

What is claimed is:

1. A phase error detector for use in a demodulator recovering a carrier signal from a received signal, using the recovered carrier signal to demodulate the received signal, thereby obtaining an in-phase demodulated signal representing transmitted data values, also obtaining a quadrature demodulated signal, comprising:

a data decision circuit determining the transmitted data values represented by said in-phase demodulated signal;

a subtractor coupled to said data decision circuit, taking a difference between said in-phase demodulated signal and said transmitted data values, thereby generating a difference signal;

a sign estimator coupled to said subtractor, using said quadrature demodulated signal and said difference signal to estimate whether said recovered carrier signal leads or lags a correct phase, thereby generating a sign signal;

a gain setting circuit multiplying said in-phase demodulated signal by a constant gain, thereby generating a product signal;

a sign setting circuit coupled to said gain setting circuit and said sign estimator, reversing a polarity of said product signal according to said sign signal, thereby generating a signed product signal;

an adder coupled to said sign setting circuit, adding said signed product signal to said quadrature demodulated signal, thereby generating a sum; and a divider coupled to said adder, dividing said difference signal by said sum, thereby generating an estimated phase error.

2. The phase error detector of claim 1, further comprising:

a selector coupled between said data decision circuit and said subtractor, receiving the transmitted data values determined by said data decision circuit, receiving a timing signal specifying certain time intervals, and receiving known data values present in said in-phase demodulated signal during said time intervals, selecting one of said known data values and the transmitted data values determined by said data decision circuit according to said timing signal, and supplying the selected data values to said subtractor 2.

3. The phase error detector of claim 1, further comprising:

a comparator coupled to said adder, comparing an absolute value of said sum with a threshold value; and a gate circuit reducing said estimated phase error when said absolute value is less than said threshold value.

4. The phase error detector of claim 1, further comprising:

a clipping circuit limiting said estimated phase error to a predetermined maximum absolute value.

5. The phase error detector of claim 1, further comprising:

a smoothing circuit smoothing the estimated phase error output by said divider.

6. The phase error detector of claim 5, wherein said smoothing circuit identifies abrupt changes in said estimated phase error, and replaces said estimated phase error with a previous estimated phase error output by said divider when said phase error changes abruptly.

7. The phase error detector of claim 5, wherein said smoothing circuit identifies an average rate of change of said estimated phase error over a certain interval, and replaces said estimated phase error with a sum of a previous estimated phase error output by said divider and said average rate of change, when said phase error changes by an amount differing abruptly from said average rate of change.

8. A phase error detector for use in a demodulator recovering a carrier signal from a received signal, using the recovered carrier signal to demodulate the received signal, thereby obtaining an in-phase demodulated signal and a quadrature demodulated signal, comprising:

a first data decision circuit determining first transmitted data values represented by said in-phase demodulated signal;

a first subtractor coupled to said first data decision circuit, taking a difference between said in-phase demodulated signal and said first transmitted data values, thereby generating a first difference signal;

a first sign estimator coupled to said first subtractor, using said quadrature demodulated signal and said first difference signal to estimate whether said recovered carrier signal leads or lags a correct phase, thereby generating a first sign signal;

a first gain setting circuit multiplying said in-phase demodulated signal by a constant gain, thereby generating a first product signal;

a first sign setting circuit coupled to said first gain setting circuit and said first sign estimator, reversing a polarity of said first product signal according to said first sign signal, thereby generating a first signed product signal;

a first adder coupled to said first sign setting circuit, adding said first signed product signal to said quadrature demodulated signal, thereby generating a first sum;

a first divider coupled to said first adder, dividing said first difference signal by said first sum, thereby generating a first estimated phase error;

a second data decision circuit determining second transmitted data values represented by said quadrature demodulated signal;

a second subtractor coupled to said second data decision circuit, taking a difference between said quadrature demodulated signal and said second transmitted data values, thereby generating a second difference signal;

a second sign estimator coupled to said second subtractor, using said in-phase demodulated signal and said second difference signal to estimate whether said recovered carrier signal leads or lags said correct phase, thereby generating a second sign signal;

a second gain setting circuit multiplying said quadrature demodulated signal by a constant gain, thereby generating a second product signal;

a second sign setting circuit coupled to said second gain setting circuit and said second sign estimator, reversing a polarity of said second product signal according to said second sign signal, thereby generating a second signed product signal;

a second adder coupled to said second sign setting circuit, adding said second signed product signal to a two's complement of said in-phase demodulated signal, thereby generating a second sum;

a second divider coupled to said second adder, dividing said second difference signal by said second sum, thereby generating a second estimated phase error;

an averaging circuit coupled to said first divider and said second divider, taking an average of said first estimated phase error and said second estimated phase error, thereby generating an average phase error; and an output selector coupled to said averaging circuit, receiving a mode signal designating a first mode in which said in-phase demodulated signal includes transmitted data, and a second mode in which said in-phase demodulated signal and said quadrature demodulated signal both include transmitted data, selecting said first estimated phase error for output from said phase detector in said first mode, and selecting said average phase error for output from said phase detector in said second mode.

9. The phase error detector of claim 8, further comprising:

an output evaluator coupled to said averaging circuit, receiving said first sum, said first estimated phase error, said second estimated phase error, and said mode signal, evaluating a reliability of said first estimated phase error according to said first sum in said first mode, evaluating a reliability of said average estimated phase error according to said first estimated phase error and said second estimated phase error in said second mode, and supplying a reliability signal to said output selector; wherein in said first mode, said output selector selects one of said first phase error, said first phase error multiplied by a positive constant less than one, and zero, according to said reliability signal; and in said second mode, said output selector selects one of said average phase error, said average phase error multiplied by a positive constant less than one, and zero, according to said reliability signal.

10. A method of estimating phase error in a demodulator recovering a carrier signal from a received signal, using the recovered carrier signal to demodulate the received signal, thereby obtaining an in-phase demodulated signal representing transmitted data values, also obtaining a quadrature demodulated signal, comprising the steps of:

determining the transmitted data values represented by said in-phase demodulated signal;

taking a difference between said in-phase demodulated signal and said transmitted data values, thereby generating a difference signal;

estimating, from said quadrature demodulated signal and said difference signal, whether said recovered carrier signal leads or lags a correct phase, thereby generating a sign signal;

multiplying said in-phase demodulated signal by a constant gain, thereby generating a product signal;

reversing a polarity of said product signal according to said sign signal, thereby generating a signed product signal;

adding said signed product signal to said quadrature demodulated signal, thereby generating a sum; and dividing said difference signal by said sum, thereby estimating said phase error.

11. The method of claim 10, wherein said step of determining further comprises the steps of:

receiving a timing signal specifying certain time intervals;

receiving known data values present in said in-phase demodulated signal during said time intervals; and using said known data values during said time intervals.

12. The method of claim 10, further comprising the steps of:

comparing an absolute value of said sum with a threshold value; and reducing the estimated phase error when said absolute value is less than said threshold value.

13. The method of claim 10, further comprising the step of:

limiting the estimated phase error to a predetermined maximum absolute value.

14. The method of claim 10, further comprising the step of:

smoothing the estimated phase error.

15. The method of claim 14, wherein said step of smoothing further comprises the steps of:

identifying abrupt changes in said estimated phase error; and replacing said estimated phase error with a previously estimated phase error when said phase error changes abruptly.

16. The method of claim 14, wherein said step of smoothing further comprises the steps of:

identifying an average rate of change of said estimated phase error over a certain interval; and replacing said estimated phase error with a sum of a previous estimated phase error and said average rate of change, when said phase error changes by an amount differing abruptly from said average rate of change.

17. A method of detecting phase error in a demodulator recovering a carrier signal from a received signal, using the recovered carrier signal to demodulate the received signal, thereby obtaining an in-phase demodulated signal and a quadrature demodulated signal, comprising the steps of:

receiving a mode signal designating a first mode in which said in-phase demodulated signal includes transmitted data, and a second mode in which said in-phase demodulated signal and said quadrature demodulated signal both include transmitted data;

determining first transmitted data values represented by said in-phase demodulated signal;

taking a difference between said in-phase demodulated signal and said first transmitted data values, thereby generating a first difference signal;

estimating, from said quadrature demodulated signal and said first difference signal, whether said recovered carrier signal leads or lags a correct phase, thereby generating a first sign signal;

multiplying said in-phase demodulated signal by a constant gain, thereby generating a first product signal;

reversing a polarity of said first product signal according to said first sign signal, thereby generating a first signed product signal;

adding said first signed product signal to said quadrature demodulated signal, thereby generating a first sum;

dividing said first difference signal by said first sum, thereby generating a first estimated phase error;

determining second transmitted data values represented by said quadrature demodulated signal in said second mode;

taking a difference between said quadrature demodulated signal and said second transmitted data values, thereby generating a second difference signal;

estimating, from said in-phase demodulated signal and said second difference signal, whether said recovered carrier signal leads or lags a correct phase, thereby generating a second sign signal;

multiplying said quadrature demodulated signal by a constant gain, thereby generating a second product signal;

reversing a polarity of said second product signal according to said second sign signal, thereby generating a second signed product signal;

adding said second signed product signal to a two's complement of said in-phase demodulated signal, thereby generating a second sum;

dividing said second difference signal by said second sum, thereby generating a second estimated phase error;

taking an average of said first estimated phase error and said second estimated phase error, thereby generating an average phase error;

selecting said first estimated phase error for output from said phase detector in said first mode; and selecting said average phase error for output from said phase detector in said second mode.

18. The method of claim 17, further comprising the steps of:

evaluating a reliability of said first estimated phase error according to said first sum in said first mode;

evaluating a reliability of said average estimated phase error according to said first estimated phase error and said second estimated phase error in said second mode;

selecting one of said first phase error, said first phase error multiplied by a positive constant less than one, and zero, according to the reliability of said first estimated phase error in said first mode; and selecting one of said average phase error, said average phase error multiplied by a positive constant less than one, and zero, according to the reliability of said average phase error in said second mode.

* * * * *